United States Patent
Cookson et al.

(10) Patent No.: US 7,167,209 B2
(45) Date of Patent: Jan. 23, 2007

(54) METHODS FOR ENCODING DATA IN AN ANALOG VIDEO SIGNAL SUCH THAT IT SURVIVES RESOLUTION CONVERSION

(75) Inventors: Christopher J. Cookson, Studio City, CA (US); Spencer Stephens, Touca Lake, CA (US)

(73) Assignee: Warner Bros. Entertainment, Inc., Burbank, CA (US)

( * ) Notice: Subject to any disclaimer, the term of this patent is extended or adjusted under 35 U.S.C. 154(b) by 0 days.

(21) Appl. No.: 10/773,944

(22) Filed: Feb. 6, 2004

(65) Prior Publication Data

US 2005/0024536 A1 Feb. 3, 2005

Related U.S. Application Data

(60) Provisional application No. 60/445,660, filed on Feb. 7, 2003, provisional application No. 60/460,928, filed on Apr. 7, 2003, provisional application No. 60/446,726, filed on Feb. 11, 2003.

(51) Int. Cl.
*H04N 7/08* (2006.01)

(52) U.S. Cl. .................... 348/473; 348/553

(58) Field of Classification Search ............... 348/473, 348/461, 581, 458, 553, 564; 382/100, 232; 713/176
See application file for complete search history.

(56) References Cited

U.S. PATENT DOCUMENTS 3,278,676 A * 10/1966 Becker ................. 348/484
4,807,031 A   2/1989 Broughton et al.
4,969,041 A  11/1990 O'Grady et al.
5,194,008 A *  3/1993 Mohan et al. ............ 434/22
5,200,822 A *  4/1993 Bronfin et al. ............ 725/22
6,045,515 A   4/2000 Lawton
6,094,228 A *  7/2000 Ciardullo et al. ......... 348/473
6,229,572 B1 * 5/2001 Ciardullo et al. ......... 348/473
6,246,439 B1 * 6/2001 Zink et al. .............. 348/473
6,307,949 B1 *10/2001 Rhoads ................. 382/100
6,430,302 B2 * 8/2002 Rhoads ................. 382/100
6,449,379 B1 * 9/2002 Rhoads ................. 382/100
6,661,905 B1 *12/2003 Chupp et al. ............ 382/100
6,785,814 B1 * 8/2004 Usami et al. ............ 713/176
2004/0024588 A1* 2/2004 Watson et al. ......... 704/200.1

OTHER PUBLICATIONS

International Search Report dated Dec. 13, 2004; corresponding PCT/US04/03619 filed Feb. 6, 2004; Publication No. WO 2004/073168 A3 published on Aug. 26, 2004; Applicant: Warner Bros. Entertainment Inc.; Inventors: CJ Cookson, S Stephens, CR Odgers.

* cited by examiner

*Primary Examiner*—Victor R. Kostak
(74) *Attorney, Agent, or Firm*—Gottlieb, Rackman & Reisman, P.C

(57) ABSTRACT

VEIL modulation is a method of "subliminal" encoding of data in a video image that is similar to a watermark. The encoding consists of alternately proportionately raised and lowered luminance on selected horizontal scan lines. The encoding can be detected using a notch filter centered at half the line frequency. The encoding is lost, however, if the resolution of the video signal is changed downward. The invention preserves the encoding by coding alternate groups of lines, not alternate lines. This allows detection with a notch filter even after a reduction in resolution.

19 Claims, 4 Drawing Sheets

(A) OriginalVideo (B) LineDoubledVideo (C) Interpolated 3:1 up-res'd Video (A) OriginalVideo (B) Half Resolution Video

METHODS FOR ENCODING DATA IN AN ANALOG VIDEO SIGNAL SUCH THAT IT SURVIVES RESOLUTION CONVERSION

RELATED APPLICATIONS

This application claims the benefit of U.S. Provisional application No. 60/445,660 filed on Feb. 7, 2003, Ser. No. 60/446,726 filed on Feb. 11, 2003, and Ser. No. 60/460,928 filed on Apr. 7, 2003.

BACKGROUND

A. Field of Invention

This invention pertains to a method and apparatus for imbedding control signals in the visible portion of a video signal.

B. Description of the Prior Art

U.S. Pat. No. 4,807,031 in the name of Broughton, et al. that issued on Feb. 21, 1989 and is entitled "Interactive Video Method and Apparatus" discloses a method and apparatus for in-band, video broadcasting of commands to interactive devices. Control data is encoded into the video image using a "subliminal" modulation scheme, a scheme that can be detected electronically but is largely imperceptible to the viewer. The encoding is in a selected sequence of video image fields. The resulting modulated video fields are within the displayed area of the video (the area that is seen by the viewer), and have alternately proportionately raised and lowered luminance on selected horizontal scan lines. As disclosed in the patent, the modulation is monitored by a light sensitive device positioned adjacent the user's television screen.

The modulation of the video signal used by Broughton, et al. is referred to herein as "VEIL modulation", VEIL being the commercial name of the system based on the patent. VEIL is simpler and easier to implement than watermarking technology in that the VEIL modulation can be sensed by looking for a single frequency in the video signal.

VEIL has been proven to work in standard definition television systems such as 525-line, 60 Hz interlaced (NTSC) and 625-line, 50 Hz interlaced (PAL). However, the introduction of new television systems such as the Advanced Television System Committee's Digital TV Standards which includes digital high definition television (HDTV), standard definition television (SDTV), data broadcasting, multi-channel surround-sound audio, and satellite direct-to-home broadcasting means that in the future video signals will be subjected to changes in resolution between the point of transmission and the display device.

The ATSC standard includes the standard definition resolutions such as 525i (the NTSC signal, 525 lines transmitted as an interlaced signal), and high definition resolutions such as 720p (720 lines transmitted as a progressive scan signal) and 1080i (1080 lines transmitted as an interlaced signal). Changing the resolution of a video signal is commonly referred to as "up res'ing" when the resolution of the video signal is increased and "down res'ing" when the resolution of the video signal is decreased.

VEIL encoding involves increasing the average luminance of one line in a field and decreasing the average luminance of the next adjacent line. There is no problem when up res'ing as will be explained below. However, if the video signal with the VEIL encoding is subjected to down res'ing, the VEIL encoded data may not be retrievable.

It is a general object of our invention to provide a form of VEIL modulation that can be detected even after down res'ing.

It is another object of our invention to provide VEIL modulation detection with the same notch filter and level detector no matter how the resolution is changed.

SUMMARY OF THE INVENTION

VEIL encoding can be detected using a notch filter centered at half the line frequency. The basic technique of the invention is to implement VEIL encoding by coding groups of lines, not alternate lines. This allows detection with a notch filter even after subsequent down res'ing.

The theory of the invention can be appreciated by considering, for example, that alternate pairs of lines of video are given increased luminance, and alternate pairs of lines are given decreased luminance. A complete cycle takes four lines. If the video signal is subjected to down res'ing, then half the lines are lost. A complete cycle of the VEIL modulation now occurs in only two lines. But in order for the frame rate to remain the same, the line sweeps of the signal with lower resolution (half the lines) have to be slowed down by half in order for it to take the same time to sweep out a complete frame. This, in turn, means that it takes the same time to detect one complete cycle (higher luminance followed by lower luminance) in both signals so the same notch filter can be used to detect the modulation. (In this case, the notch filter has to be at one-quarter the line frequency, rather than one-half as in the Broughton, et. al patent, because a complete cycle in the original signal prior to a change in resolution now takes four lines instead of only two.)

BRIEF DESCRIPTION OF THE DRAWINGS

Further objects, features and advantages of the invention will become apparent upon consideration of the following detailed description in conjunction with the drawing, in which.

DETAILED DESCRIPTION

In each of FIGS. 1–4, waveform (A) represents the original or source video signal with VEIL encoding. Waveforms (B) and (C) represent respective signals after a resolution change. In each waveform, the horizontal axis is time and the vertical axis is luminance. Each horizontal scan line is represented as a period of zero luminance which is the horizontal blanking interval followed by a longer period of with a positive luminance. The luminance is shown as constant during the horizontal line which is of course a simplification of a real video signal where the luminance might fluctuate along each line. The solid zigzag line represents the output of the filter labeled X in the VEIL detection system shown in FIG. 5.

Figure 1:
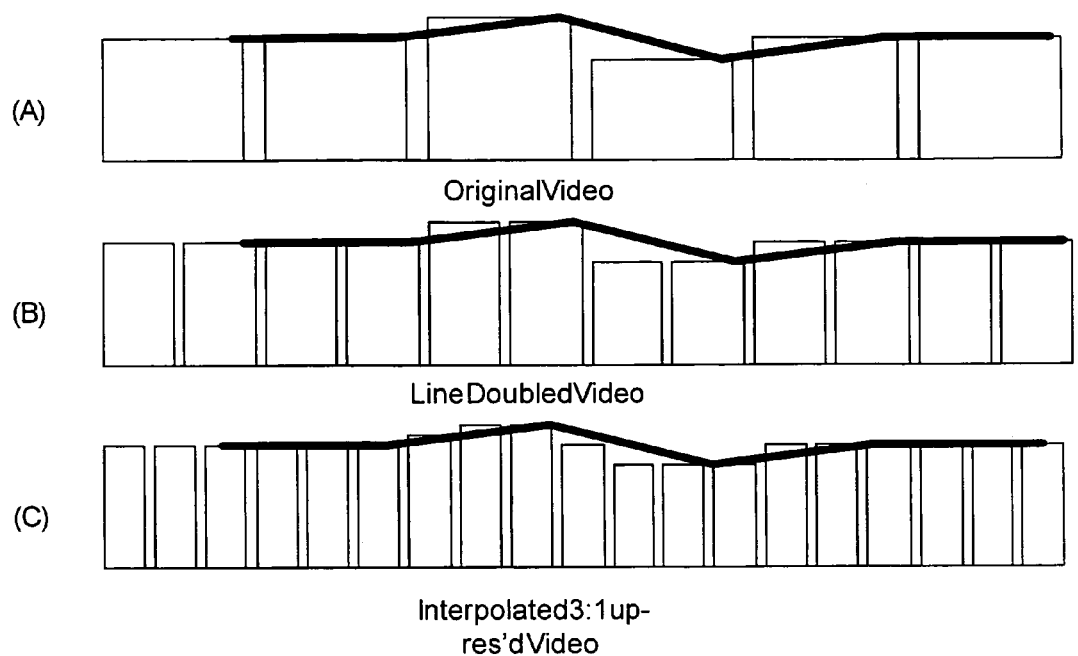
FIG. 1 depicts up res'ing of a signal.
Figure 2:
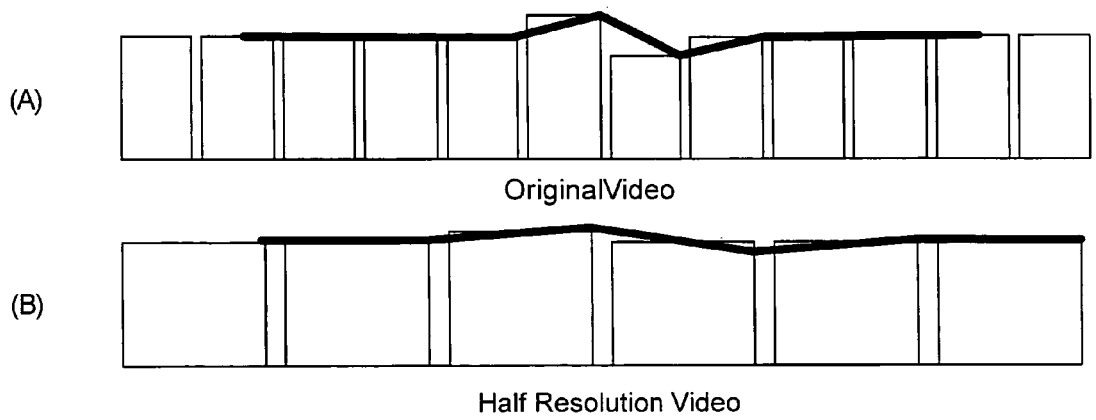
FIG. 2 depicts down res'ing of a signal.

FIG. 1 shows how with up-res'ing the VEIL encoded data in an original video signal is still detectable. The original signal of FIG. 1(A) is shown with twice the resolution in FIG. 1(B). FIG. 3(B) shows the signal with an interpolated increase in resolution of three times the original. With any of the three different resolutions of FIG. 1, the VEIL encoded data remains detectable using a notch filter centered on ½ $f_{hl}$ where $f_{hl}$ is the horizontal line frequency of the original video. Doubling the number of lines, for example, requires that each of them be swept across the screen in half the time, in order to leave the frame rate unchanged. But this means that it takes the same time to detect the same number of lines. So the same notch filter can be used for the up res'd signal.

In FIG. 2(A), the VEIL encoding of the data has been applied to a video signal that does not have the lowest possible resolution. The signal might be, for example, a 720p HDTV signal. FIG. 2(B) represents a 525i standard definition signal. As in the case of FIG. 1, the VEIL encoded data in the original signal can be detected using a notch filter centered on $f_{hl}$, the horizontal line frequency of the original video. However, if the signal is subject to a decrease in resolution as shown in FIG. 2(B), the VEIL encoding is now more difficult to detect. Detection requires a notch filter centered on ½ $f_{hl}$, where $f_{hl}$ is the horizontal line frequency of the new video of FIG. 2(B) and a more sensitive circuit is required since the amplitude of the VEIL modulation is reduced.

Figure 3:
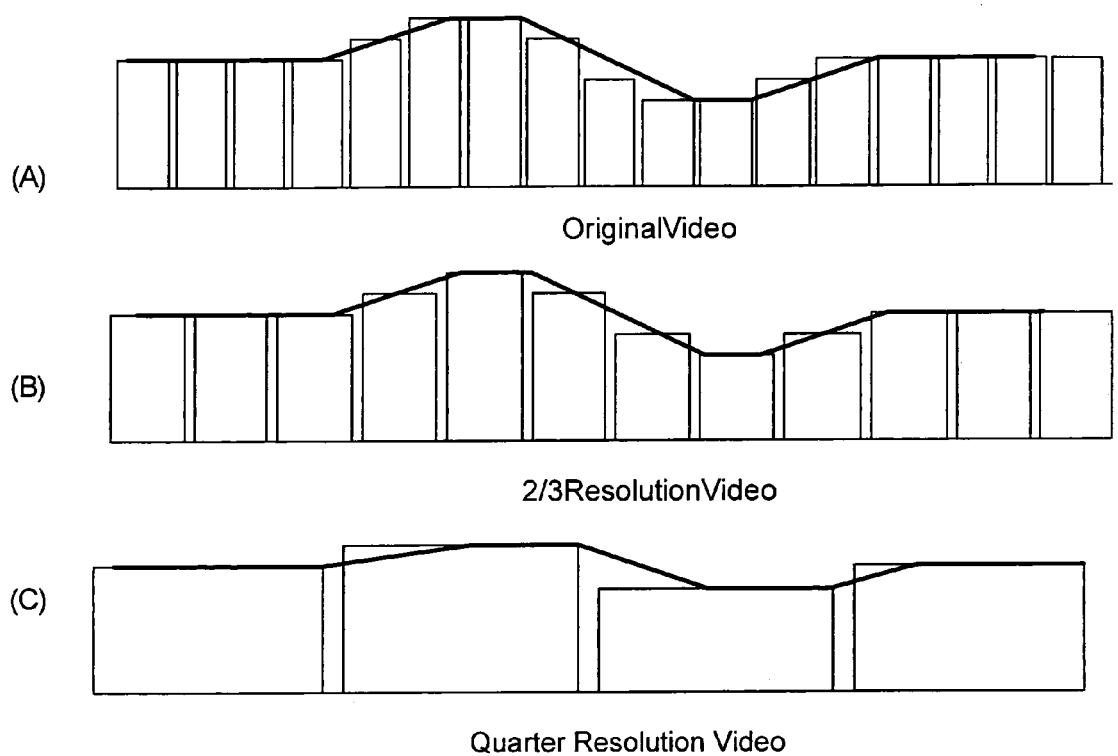
FIGS. 3 and 4 show alternative coding methods that allow the same notch filter to detect VEIL encoding whether or not there has been down res'ing.
Figure 4:
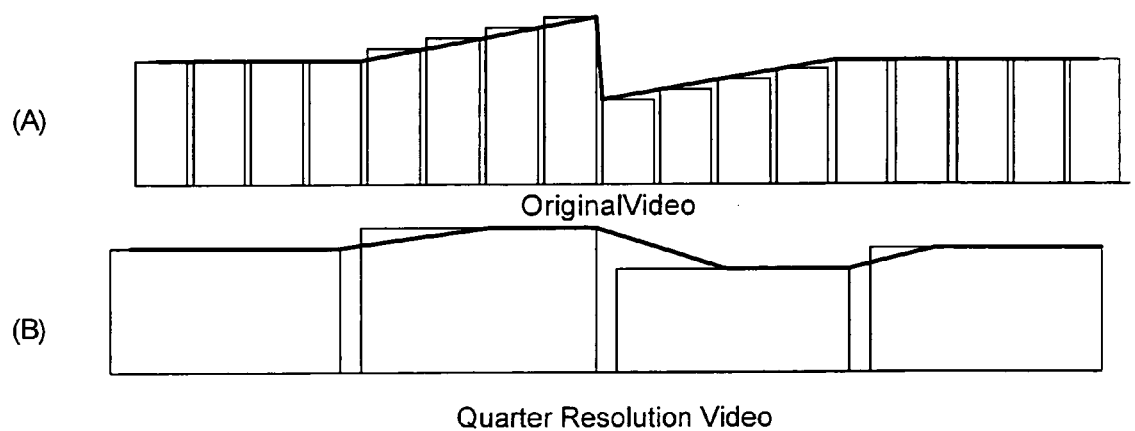

FIGS. 3 and 4 show alternative methods of encoding the data in a way that is very similar to VEIL but allow the coding to be detected by the same notch filter and level detector regardless of any decrease in the resolution of the video signal.

In this method, the data is encoded by modifying the average luminance of N adjacent lines in a field, where N is twice the reduction in video resolution that the encoding is required to survive. (If no change in resolution is required, then N is 2 and the coding method is VEIL.)

In FIG. 3, the data is encoded in such a way that that the encoding will survive a reduction in resolution by a factor of 4 from the original video signal in FIG. 3(A) to the quarter resolution video in FIG. 3(C). In this case, the encoding involves 8 adjacent lines (N=8, since N is twice the 4-fold reduction in video resolution).

However, simply applying the VEIL algorithm across all N lines by increasing the luminance on the first N/2 adjacent lines, e.g., by 10%, and then reducing the luminance on the next N/2 adjacent lines by the same amount will not be satisfactory since the encoding is unlikely to remain subliminal. (The value of 10% is chosen for example only; the actual value used will depend on different design considerations such as the ability of the detection circuitry to detect lower values of luminance variation.)

In FIG. 3(A), the luminance level on each of the lines is controlled by a sinusoidal function with a full period of 8 lines that boosts and reduces the average horizontal luminance by up to 10%. The gain applied to each line by such a function is approximately as follows:

| Line | Percentage Change |
|---|---|
| 1 | 6 |
| 2 | 10 |
| 3 | 9 |
| 4 | 3 |
| 5 | −3 |
| 6 | −9 |

-continued

| Line | Percentage Change |
|---|---|
| 7 | −10 |
| 8 | −6 |

In FIG. 4(A), the data is encoded using a sawtooth function to control the chance in average luminance in each of the N lines. Here, the gain applied to each line by such a function is approximately as follows:

| Line | Percentage Change |
|---|---|
| 1 | 2.5 |
| 2 | 5 |
| 3 | 7.5 |
| 4 | 10 |
| 5 | −10 |
| 6 | −7.5 |
| 7 | −5 |
| 8 | −2.5 |

The two tables just considered reveal an important feature of the invention. While in Broughton, et. al alternate lines have their luminances changed in opposite directions, in our invention the luminances of the lines are changed in such a way that most of the lines are adjacent other lines whose luminances are changed in the same direction. In fact, in each table, every line is adjacent at least one other line whose luminance is changed in the same direction, and only two of the lines are adjacent others whose luminances are changed in the opposite direction.

In summary, the method of encoding data into the video signal such that it survives a reduction in resolution in the video signal is to encode it across N lines where N is twice the ratio between the original resolution of the image and the lowest resolution at which the encoding must still be detectable. Thus, if the highest resolution to be accommodated is 1080i and the lowest resolution is 525i, then N is 4 (the ratio of the number of lines in 1080i to those in 525i is approximately 2).

No matter what the change in resolution, and whether it is up or down, the center frequency of the notch filter in the detection system can be set to a constant which is half of the horizontal line frequency of the lowest resolution video signal in the range of video signals to be accommodated. For example, if the lowest resolution video signal to be accommodated is NTSC, then the notch filter center frequency is set to ½ $f_{hl}$ on all detectors where $f_{hl}$ is the NTSC horizontal line frequency.

When a video signal is converted from an interlaced scan to a progressive scan and vice versa, there is an increase or decreases in resolution similar to that described above. For example, if a 525 line progressive scan video signal is converted to a 525 line interlaced video signal, then the 525 line frame becomes two fields with 262.5 lines each. For VEIL encoding it is adjacent lines in the same field that matter, and therefore this conversion has the same effect on VEIL encoding as halving the resolution. The converse is also true, for example, going from a 525 interlaced video signal to a 525 line progressive scan video signal is akin to doubling the resolution.

Figure 5:
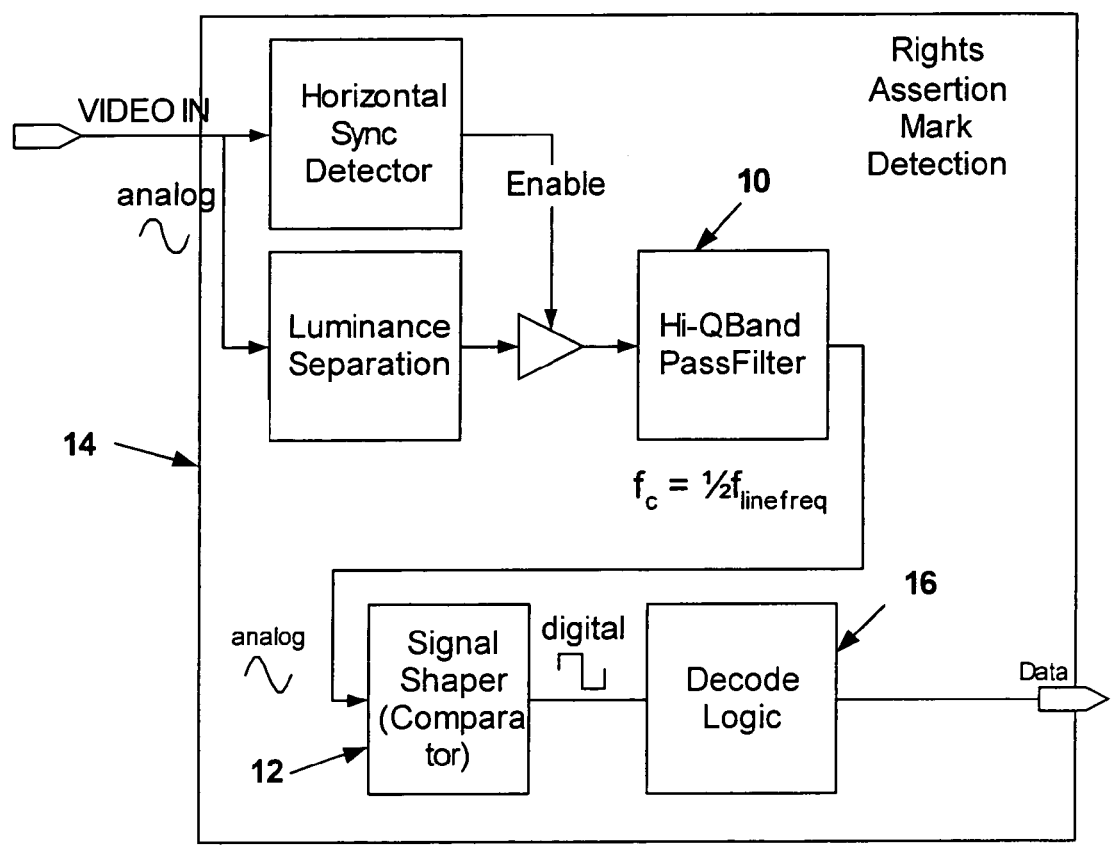
FIG. 5 shows a circuit for detecting VEIL encoded data in a video signal.

The circuit of FIG. 5 shows how VEIL modulation can be detected as suggested by Broughton, et al, where the detection is designed, as discussed above, to detect a frequency occurring at one-half the lowest line frequency of the range of video signals to be accommodated. All that is required to detect the frequency is a high-Q Band Pass filter 10, as shown in FIG. 5, to isolate the VEIL frequency. It is then rectified and tested against a comparator threshold in the signal shaper circuitry 12. The final decode of the signal, such as determining whether the VEIL encoding is present in one line and not in the next takes place in the decode logic 16.

Figure 6:
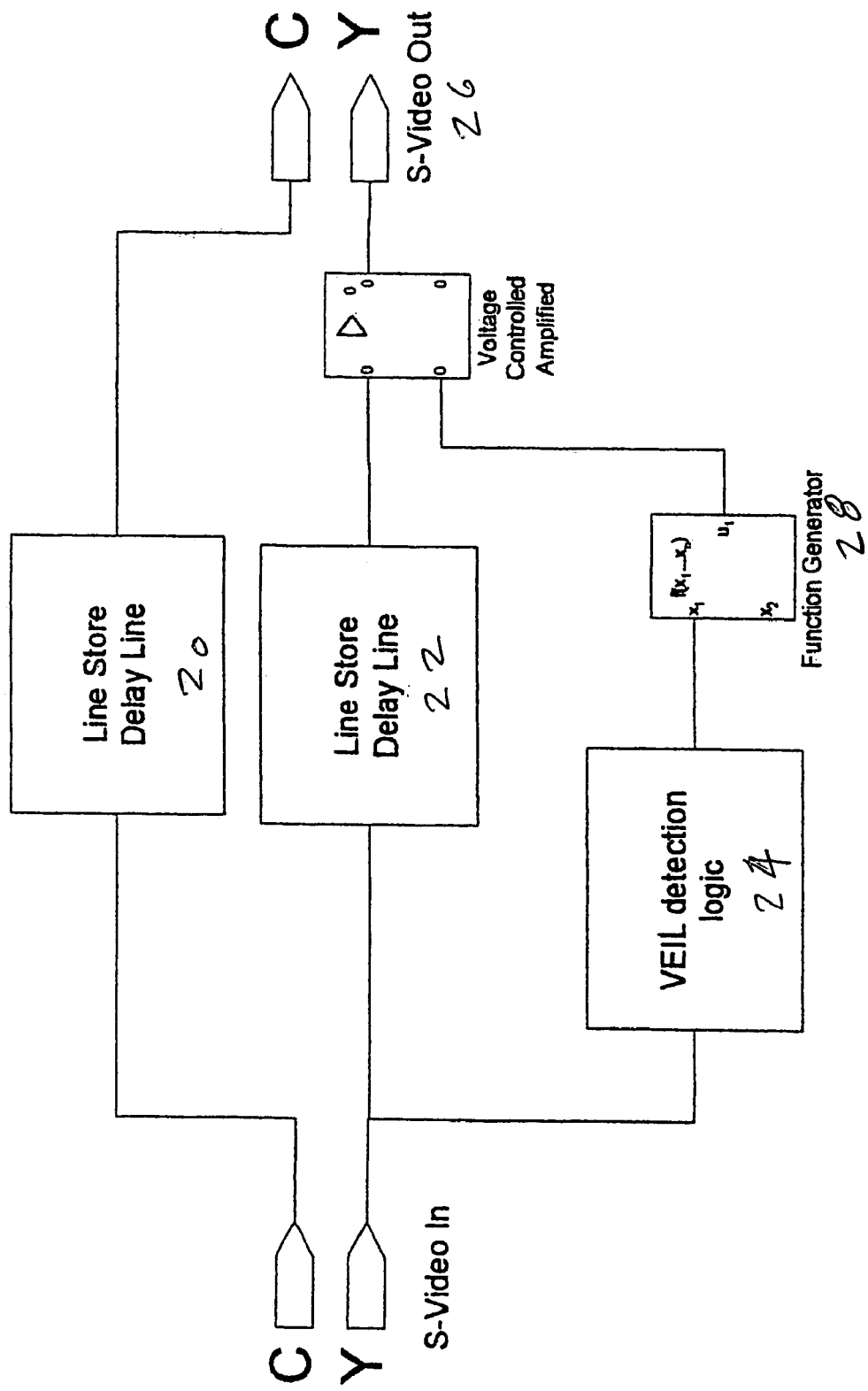
FIG. 6 shows a circuit for removing VEIL encoded data from a video signal.

In certain cases it may be desirable to remove data encoded into a video signal using VEIL or a similar encoding scheme. For example, someone attempting to circumvent content protection signaling that used VEIL encoding might attempt to remove the VEIL encoded content protection. FIG. 6 shows a block diagram of such a removal device. This particular implementation operates on an S-video signal, but one skilled in the art can construct a device to remove the encoding from a component video signal or a device to remove the encoding from a composite video signal.

In FIG. 6, the luminance signal of the incoming video from which it is desired to remove the VEIL encoded data is split between a delay line that incorporates a line store 22 capable of storing a certain number of lines and a VEIL encoding detection circuit 24 that is largely the same as circuit 14 of FIG. 5. The length of the delay is adjusted such that the first line in a VEIL encoded pattern exits the line store delay line at the same moment that the output of the VEIL detector signals VEIL is present. A second delay line 20 operates in parallel providing the same delay to the chroma signal so that the two parts of the S-video signal are not out of phase when they are output from the circuit at 26.

The output of the detector triggers a function generator 28 that generates a waveform that is the inverse of the VEIL encoding scheme. This waveform is fed into a voltage controlled amplifier which changes the average luminance of the lines being clocked out of the line store delay line. For example, in standard VEIL encoding the average is raised by 10% on the first of two field adjacent lines and lowered by 10% on the second of two field adjacent lines. In this case the function generator output would cause the voltage controlled amplifier to decrease its gain to 0.9 (10% down from unity) for the first line and increase its gain to 1.1 (10% up from unity) for the second line. For the remaining lines where VEIL encoding is not detected the gain is unity. If more complex encoding schemes are used as described above, then the function generator generates a complementary waveform Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What we claim is:

1. A method for subliminally encoding data in the image portion of a video signal, wherein the resolution of the image is decreased by a factor of N comprising:
    selecting a plurality of 2N consecutive lines in a frame of the video signal;
    increasing the luminances of N consecutive lines by an amount that is not visually perceptible; and
    decreasing the luminances of the next N consecutive lines.

2. A method for subliminally encoding data in accordance with claim 1 wherein when the luminance of each line is increased or decreased uniformly.

3. A method for subliminally encoding data in the image portion of a video signal in accordance with claim 2 wherein the luminances of said N lines is varied according to a sinusoidal function.

4. A method for subliminally encoding data in the image portion of a video signal in accordance with claim 2 wherein the luminances of said N lines is changed according to a sawtooth function.

5. A method for subliminally encoding data in the image portion of a video signal in accordance with claim 2 wherein the luminance is increased a constant amount for N/2 lines and decreased by the same constant amount for N/2 lines.

6. A method for subliminally encoding data in the image portion of a video signal in accordance with claim 2 wherein for each of said N lines for which the luminance is increased by a certain amount there is a corresponding line for which the luminance is decreased by the same amount.

7. A method for encoding data in the image portion of a video signal comprising:
    modifying a group of adjacent lines of a frame by increasing and decreasing the luminances of said group lines in a frame following a prescribed pattern that does not affect the image perceived by the human eye, the luminances of the lines being increased and decreased by amounts selected to render said increases and decreases substantially invisible to a human eye, wherein in said prescribed pattern wherein substantially all of the lines are adjacent other lines whose luminances are changed in the same direction;
    transmitting said video signal with said modified lines;
    downrezing said video signal; and
    extracting said data from said modified lines, wherein said data survives said downrezing.

8. A method for encoding data in the image portion of a video signal in accordance with claim 7 wherein when the luminance of a line is increased or decreased uniformly.

9. A method for encoding data in the image portion of a video signal in accordance with claim 7 wherein the luminances of said lines are changed according to a sinusoidal function.

10. A method for encoding data in the image portion of a video signal in accordance with claim 7 wherein the luminances of said lines are changed according to a sawtooth function.

11. A method for encoding data in the image portion of a video signal in accordance with claim 7 wherein the luminance is increased a constant amount for half the lines and decreased by the same constant amount for the other half of the lines of said group.

12. A method for encoding data in the image portion of a video signal in accordance with claim 7 wherein for each of said lines for which the luminance is increased by a certain amount there is a corresponding line for which the luminance is decreased by the same amount.

13. A method for subliminally encoding data in the image portion of a video signal comprising selecting 2N consecutive lines in a frame increasing the luminances of a group of consecutive N lines from said 2N consecutive lines and decreasing the luminance of the next group of consecutive N lines, said increasing and decreasing of said luminance being performed in a prescribed pattern selected to eliminate any effects on the image perceived by the human eye.

14. A method for encoding data in the image portion of a video signal in accordance with claim 13 wherein when the luminance of a line is increased or decreased, the entire line is changed uniformly.

15. A method for encoding data in the image portion of a video signal in accordance with claim 13 wherein the luminances of said lines are changed according to a sinusoidal function.

16. A method for encoding data in the image portion of a video signal in accordance with claim 13 wherein the luminances of said lines are changed according to a sawtooth function.

17. A method for encoding data in the image portion of a video signal in accordance with claim 13 wherein the luminance is increased a constant amount for half the lines and decreased by the same constant amount for the other half of the lines.

18. A method for encoding data in the image portion of a video signal in accordance with claim 13 wherein for each of said lines for which the luminance is increased by a certain amount there is a corresponding line for which the luminance is decreased by the same amount.

19. A method of encoding data in the image portion of the video signal wherein said video signal is downrezed by a factor N further comprising:
   selecting a group of 2N successive lines from a frame of the video signal;
   raising the amplitude of N successive lines of said group by an amount small enough so that the change in the video signal is substantially imperceptible;
   lowering the amplitude of the remaining N successive lines of said group by the same amount; and
   decoding said data, wherein the decoded data is unaffected by said downrezing.

* * * * *